(12) United States Patent
Coelho Schiavo et al.

(10) Patent No.: US 12,025,249 B2
(45) Date of Patent: Jul. 2, 2024

(54) TELESCOPIC JOINT

(71) Applicant: PETROLEO BRASILEIRO S.A. - PETROBRAS, Rio de Janiero (BR)

(72) Inventors: Raphael Coelho Schiavo, Rio de Janeiro (BR); Paulo Sergio Freire, Rio de Janeiro (BR); Nelson Patricio Junior, Rio de Janeiro (BR); Emanuel Freire Sandes, Niteroi (BR); Diana Albani Siqueira, Rio de Janeiro (BR)

(73) Assignee: PETROLEO BRASILEIRO S.A.-PETROBRAS, Rio de Janeiro (BR)

( * ) Notice: Subject to any disclaimer, the term of this patent is extended or adjusted under 35 U.S.C. 154(b) by 80 days.

(21) Appl. No.: 17/044,896

(22) PCT Filed: Apr. 2, 2019

(86) PCT No.: PCT/BR2019/050120
§ 371 (c)(1),
(2) Date: Oct. 2, 2020

(87) PCT Pub. No.: WO2019/191825
PCT Pub. Date: Oct. 10, 2019

(65) Prior Publication Data
US 2021/0148497 A1    May 20, 2021

(30) Foreign Application Priority Data
Apr. 5, 2018  (BR) .......................... 102018006918-7

(51) Int. Cl.
*F16L 27/12*  (2006.01)
*C10G 11/18*  (2006.01)
*F16L 51/00*  (2006.01)

(52) U.S. Cl.
CPC .............. *F16L 27/12* (2013.01); *C10G 11/18* (2013.01); *F16L 51/00* (2013.01)

(58) Field of Classification Search
CPC . F16L 23/24; F16L 23/20; F16L 27/12; F16L 27/12751
See application file for complete search history.

(56) References Cited

U.S. PATENT DOCUMENTS 2,217,664 A    10/1940   Berger
2,535,288 A * 12/1950   Honkanen ................. F16L 5/08
                                                     277/580

(Continued)

FOREIGN PATENT DOCUMENTS

AR          059979 A1   5/2008
BR          8404451 A    3/1986

(Continued)

*Primary Examiner* — Matthew Troutman
*Assistant Examiner* — Alexander T Rufrano
(74) *Attorney, Agent, or Firm* — Raphael Bellum PLLC

(57) ABSTRACT

A telescopic joint for connecting two pipes in a separating vessel of a fluid catalytic cracking unit includes a first pipe and a second pipe; wherein the two pipes are connected together at their ends by a sliding ring comprising a first portion extending substantially parallel to the first and second pipes, and a second portion extending substantially perpendicular to the first and second pipes, to thereby form an L profile; the first pipe comprises a fitting seat fixed at its end, and a flanged ring, the flanged ring and the fitting seat being configured to surround at least partially the second portion of the sliding ring; and the telescopic joint comprises a first plurality of gaskets positioned in a first space between the second portion of the sliding ring and the fitting seat and distributed in a direction parallel to the second portion of the sliding ring.

17 Claims, 2 Drawing Sheets

(56) References Cited

U.S. PATENT DOCUMENTS

| | | | | |
|---|---|---|---|---|
| 2,703,722 | A * | 3/1955 | Christophersen | F16L 23/10 |
| | | | | 285/340 |
| 2,985,473 | A * | 5/1961 | Parker | F16L 5/06 |
| | | | | 277/606 |
| 3,194,589 | A * | 7/1965 | Bohls | F16L 55/052 |
| | | | | 285/302 |
| 4,331,338 | A * | 5/1982 | Caldwell | F24F 13/0254 |
| | | | | 277/606 |
| 4,427,222 | A * | 1/1984 | Abbes | G21F 5/12 |
| | | | | 285/368 |
| 4,502,947 | A | 3/1985 | Haddad | |
| 5,024,454 | A | 6/1991 | McGilp | |
| 5,088,775 | A * | 2/1992 | Corsmeier | F02K 1/805 |
| | | | | 285/24 |
| 5,569,435 | A | 10/1996 | Fusco | |
| 7,478,839 | B2 * | 1/2009 | Barber | F16L 27/125 |
| | | | | 277/650 |
| 10,830,077 | B2 * | 11/2020 | Dunnigan | F01D 11/003 |
| 2007/0236011 | A1 * | 10/2007 | Freire | F16L 27/12 |
| | | | | 285/302 |

FOREIGN PATENT DOCUMENTS

| | | | | | |
|---|---|---|---|---|---|
| BR | 9303773 | A | | 10/1995 | |
| BR | 9901484 | A | | 11/2000 | |
| BR | 0002087 | A | | 1/2002 | |
| BR | 0204737 | A | | 6/2004 | |
| BR | 10506285 | A | | 10/2007 | |
| CN | 201697122 | U | * | 1/2011 | |
| CN | 204853463 | U | * | 12/2015 | |
| CN | 105371044 | B | * | 10/2017 | |
| EP | 289991 | A | * | 11/1988 | B01J 8/26 |
| JP | H116589 | A | * | 1/1999 | |
| WO | WO-0065269 | A1 | * | 11/2000 | F16L 27/12 |

\* cited by examiner

TELESCOPIC JOINT

CROSS-REFERENCE TO RELATED APPLICATION

This application is the national stage application of International Application No. PCT/BR2019/050120 filed 2 Apr. 2019, which claims the benefit of Brazilian Patent Application No. BR 10 2018 006918-7, filed 5 Apr. 2018, which is incorporated herein by reference in its entirety.

FIELD OF THE INVENTION

The present disclosure relates to processing equipment in a fluid catalytic cracking unit (FCCU) in oil refining processes. More particularly, the present disclosure relates to a telescopic joint used for connecting two concentric pipes of pairs of cyclones in a separating vessel of a fluid catalytic cracking unit (FCCU).

BACKGROUND OF THE INVENTION

Telescopic joints are usually employed in the prior art for connecting together two concentric pipes of pairs of cyclones in a separating vessel of a fluid catalytic cracking unit (FCCU).

Various configurations of this type of telescopic joint for application in an FCCU are known from the prior art. In general, these elements adopt a sliding ring to prevent passage of gas and allow free differential thermal expansion in various directions between a cyclone or a pseudocyclone connected directly to the reactor vessel, and a first cyclone, without allowing passage of gases between their components, thus guaranteeing the desired flow rate only for the collecting pipes.

A closed cyclone system is also known for gas-solid separation in an FCCU that confers reduced formation of coke in separating vessels, preventing carry-over of the separated catalyst to the cyclones of subsequent stages.

However, to make operation viable by combining the gains obtained by using a telescopic joint with a sliding ring and by using external collecting pipes in a pseudocyclone, passage of gas and steam through the annular space generated in the joint must be avoided as far as possible.

Some documents of the prior art address the problem cited above, and will be presented hereunder.

Document BR9901484A (published in Brazil as PI-9901484-0 B1) discloses a telescopic joint with a sliding ring coupled to the connecting pipes, so as to guarantee an annular section with constant spacing in the region of connection of the connecting pipes and allowing accommodation of the differential temperature displacements.

Document BR0204737B1 (published in Brazil as PI-0204737-3 B1) discloses a cyclone system and a process for separating solid and gaseous particles in FCC processes. The system in this document comprises a telescopic joint with a sliding ring such as described in document BR9901484A.

For a number of reasons, the sealing system in the two documents cited does not provide a satisfactory seal in the telescopic joint, allowing unwanted passage of gases, which must be avoided.

Document BRPI0506285A (published in Brazil as PI-0506285-3 A2) discloses a telescopic joint with a sliding ring for application in an FCCU, to prevent passage of gas and allow free differential thermal expansion in various directions between a pseudocyclone connected directly to the reactor vessel, and a first cyclone, with the concern of not allowing passage of gases between their components, thus guaranteeing the desired flow in the process only through the collecting pipes.

FIG. 1 shows a configuration of telescopic joint as proposed in document BRPI0506285A, which describes a telescopic joint formed by the connecting pipes of the cyclones with an L-shaped sliding ring. In this configuration, vertical gaskets are adopted in the vertical portion of the L-shaped sliding ring to increase the sealing capacity of the joint and prevent leakage of gases in this region.

However, it can be seen that the horizontal portion of the L-shaped sliding ring does not comprise any sealing element to prevent passage of gas and steam through this region, which may present a problem, i.e. leakage of gas and steam during use.

As will be described in more detail below, the present disclosure aims to solve the problems of the prior art described above in a practical and efficient manner.

SUMMARY OF THE INVENTION

The aim of the present disclosure is to provide a telescopic joint for connecting two concentric pipes of pairs of cyclones in a separating vessel of a fluid catalytic cracking unit (FCCU) that is intended to provide improved or complete sealing of the two connected elements, preventing leakage of gas and steam. In order to achieve the aim described above, the present disclosure provides a telescopic joint for connecting two pipes in a separating vessel of a fluid catalytic cracking unit comprising a first pipe and a second pipe; wherein the two pipes are connected together at their ends by a sliding ring comprising a first portion extending substantially parallel to the first and second pipes, and a second portion extending substantially perpendicular to the first and second pipes, to thereby form an L profile; the first pipe comprises a fitting seat fixed at its end, and a flanged ring, the flanged ring and the fitting seat being configured to surround at least partially the second portion of the sliding ring; and the telescopic joint comprises a first plurality of gaskets positioned in a first space between the second portion of the sliding ring and the fitting seat and distributed in a direction parallel to the second portion of the sliding ring.

Optionally, the first portion of the sliding ring extends around the second pipe.

Optionally, a second space is formed between the sliding ring and the second pipe, and a second plurality of gaskets is provided in the second space and distributed in a direction parallel to the first portion of the sliding ring.

Optionally, a compression element is provided for exerting a force for urging the fitting seat towards the flanged ring.

Optionally, the compression element comprises one or more screws.

Optionally, the joint further comprises a stop positioned between the flanged ring and the fitting seat, wherein the stop is configured to prevent crushing of the first plurality of gaskets or seizing of the joint in the radial direction.

Optionally, the stop comprises a first projection located on the fitting seat, and a second projection located on the flanged ring.

Optionally, the second plurality of gaskets comprise rings of metal braid with wrapped around a material resistant to a temperature of up to 600° C.

Optionally, the first plurality of gaskets comprise rings of metal braid wrapped around a material resistant to a temperature of up to 600° C.

Optionally, the second plurality of gaskets are arranged sequentially with a sufficient number of turns for filling the entire length of the annular space.

Optionally, the number of turns is six or more.

Optionally, the second plurality of gaskets are arranged sequentially with a sufficient number of turns for filling the space between the sealing seat and the sliding ring.

Optionally, the number of turns is two or more.

Optionally, the sliding ring is at least partially constructed of the same material as the pipes.

Optionally, the first pipe and the second pipe are concentric.

Optionally, the first portion of the sliding ring is substantially vertical in use and the second portion of the sliding ring is substantially horizontal in use.

Optionally, the first and second pipes are in a cyclone.

Optionally, the first pipe has a larger diameter than the second pipe.

There is also disclosed a bidirectional telescopic joint for connecting two concentric pipes of pairs of cyclones in a separating vessel of a fluid catalytic cracking unit in which the two concentric pipes (2a,2b) are connected together at their ends by a sliding ring (4) with an L profile, integral with the two concentric pipes (2a,2b), in which the sliding ring (4) comprises a vertical portion and a horizontal portion, in which the larger-diameter pipe (2a) comprises a fitting seat (11) fixed at its end, in which a flanged ring (13) is envisaged, configured to surround at least partially the horizontal portion of the sliding ring (4), in which a compression element (12) is configured for exerting a force for compressing the fitting seat (11) against the flanged ring (13), in which the sliding ring (4) comprises a vertical annular space (3a) in the recess area with the smaller-diameter pipe (2b), in which the vertical annular space (3a) comprises special vertical gaskets (5a) resistant to high temperatures, the telescopic joint being characterized in that it comprises special horizontal gaskets (5b) resistant to high temperatures positioned in the space between the horizontal portion of the sliding ring (4) and the fitting seat (11).

Optionally, the compression element (12) comprises screws.

Optionally, the joint comprises a stop (14) positioned between the sliding ring (4) and the supporting seat (11), in which the stop is configured to prevent crushing of the horizontal gaskets (5b) or seizing of the joint in the radial direction.

Optionally, the vertical gaskets (5a) and horizontal gaskets (5b) comprise rings of metal braid with insertion of material resistant to a temperature of up to 600° C.

Optionally, the vertical gaskets (5a) are arranged sequentially with a sufficient number of turns for filling the entire length of the annular space (3a), in which the minimum number of turns is six turns; and the horizontal gaskets (5b) are arranged sequentially with a sufficient number of turns for filling the horizontal space (3b) between the sealing seat (11) and the sliding ring (4), in which the minimum number of turns is two turns.

Optionally, the sliding ring (4) is constructed of material equivalent to that specified for the concentric pipes (2a,2b).

BRIEF DESCRIPTION OF THE FIGURES

The detailed description presented hereunder refers to the appended figures and their respective reference numbers.

DETAILED DESCRIPTION OF THE INVENTION

Firstly, it is emphasized that the description given hereunder is based on a preferred embodiment of the invention. As will be obvious to a person skilled in the art, however, the invention is not limited to this particular embodiment.

Figure 2:
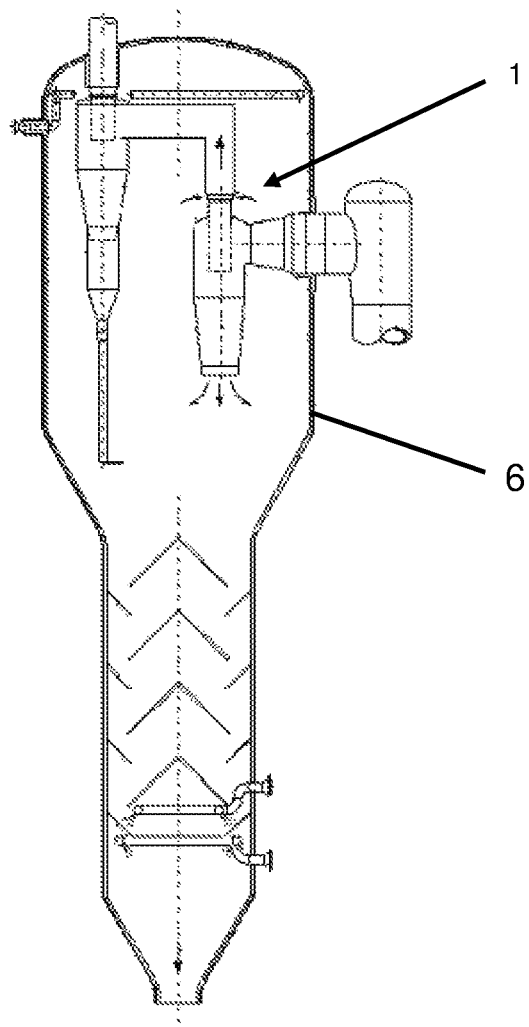
FIG. 2 shows a general view of a cyclone system inside a separating vessel of an FCCU known from the prior art.

FIG. 2 shows a general view of a cyclone system inside a separating vessel of an FCCU known from the prior art.

Figure 3:
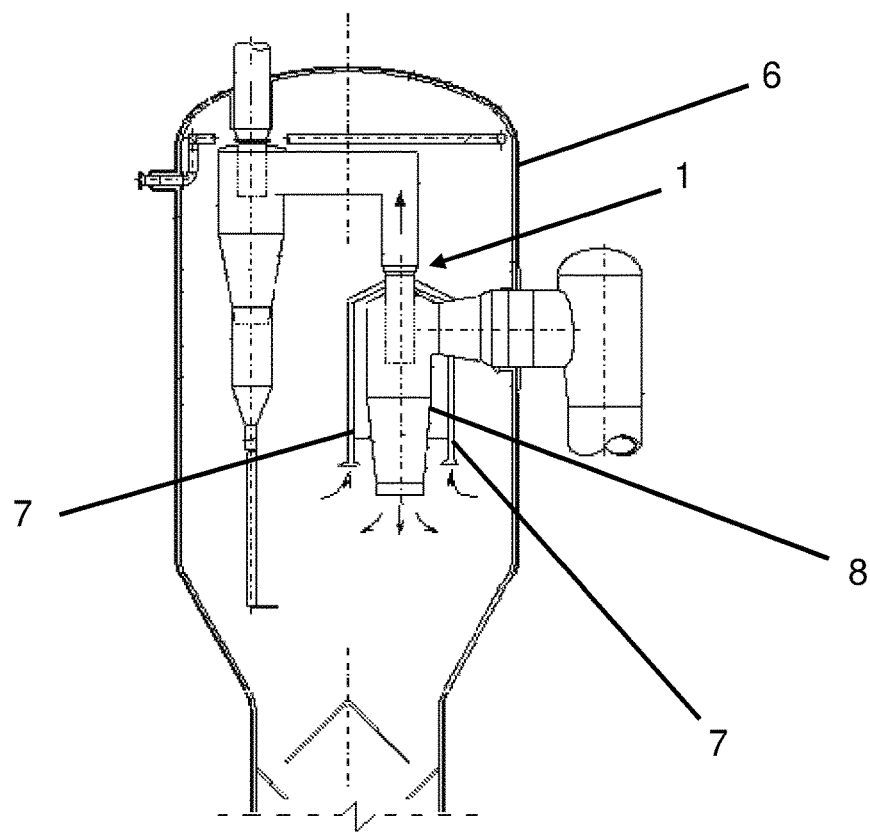
FIG. 3 shows a view of a pseudocyclone that comprises external collecting pipes as known from the prior art.

FIG. 3 shows a view of a cyclone (or pseudocyclone) that comprises external collecting pipes as known from the prior art. As is known by a person skilled in the art, the external collecting pipes 7 are used for optimizing the purging of gases present in the separating vessel 6 of the FCCU.

In general, the system illustrated comprises a cyclone system (which may be a closed cyclone system) for gas-solid separation. Such a system may be used in an FCCU that confers reduced formation of coke in separating vessels 6, preventing carry-over of the separated catalyst to the cyclones of subsequent stages.

The system in question comprises a pseudocyclone 8, provided with external collecting pipes 7. The pipes 7 optimize the purging of gases and steam from the separating vessel 6 with a decrease in the residence time of the gaseous hydrocarbons in the vessel. As a result, the system prevents reactions of overcracking and coke formation in the separating vessel 6.

Figure 1:
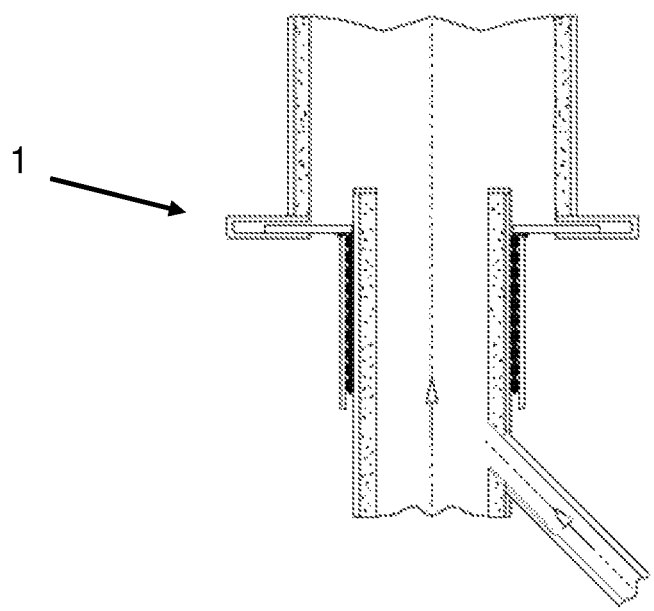
FIG. 1 shows a configuration of telescopic joint as known from the prior art.

The configuration of the telescopic joint 1 illustrated in FIGS. 1, 2 and 3, positioned inside a separating vessel 6 with external collecting pipes 7 in a pseudocyclone 8, comprises two concentric pipes 2a,2b of different diameters, which are connected together at their ends by a sliding ring.

Figure 4:
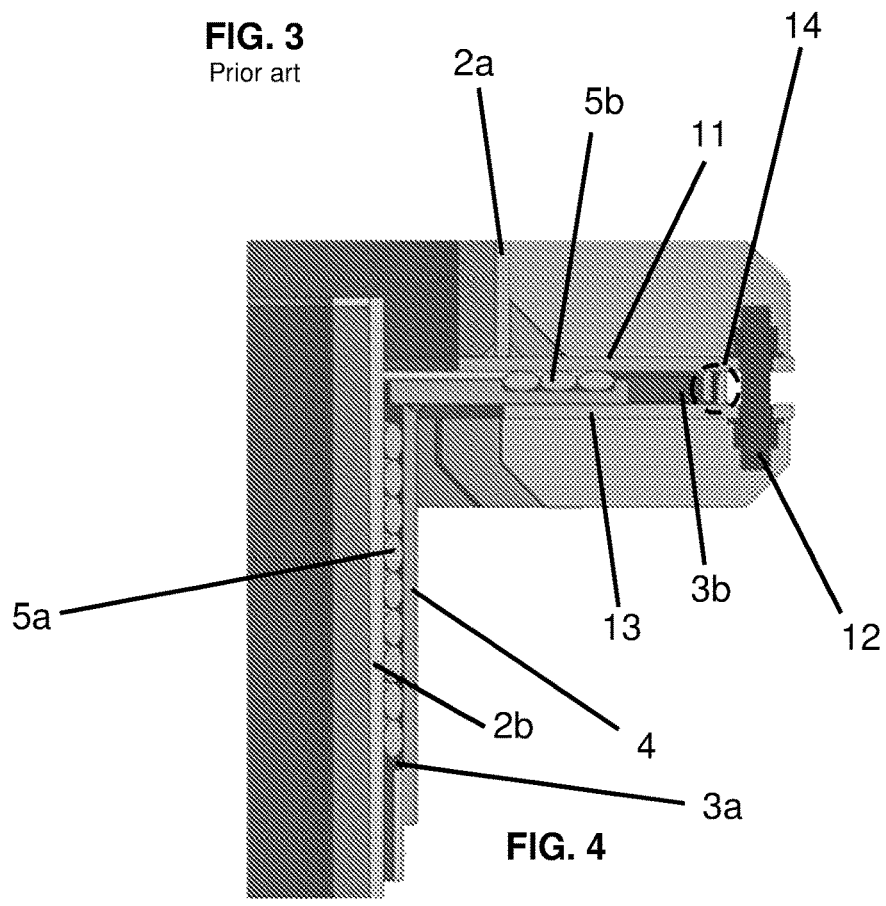
FIG. 4 shows a detail of the telescopic joint of the closed cyclone system according to the present disclosure.

FIG. 4 shows a detail of the telescopic joint according to the present disclosure, which will be described in detail in the following paragraphs. The telescopic joint may be used in a cyclone system, and in particular in a closed cyclone system. It will be appreciated that FIG. 4 shows one half of a cross-section through the pipe and joint, compared to FIG. 1. In other words, the arrangement of FIG. 4 has a corresponding part on the radially opposite side which is not shown (i.e. reflected in the same position as the dotted line in FIG. 1). The telescopic joint may be known as a bidirectional telescopic joint as it allows, or compensates for, movement in two directions (which may be perpendicular).

According to the present disclosure, there is provided a telescopic joint 1 comprising two pipes 2a and 2b of different diameters. As shown, the first pipe 2a has a larger diameter than the second pipe 2b. However, the joint 1 may also be provided the other way around, such that the second pipe 2b has a larger diameter than the first pipe 2a. When mounted in a fluid catalytic cracking unit (FCCU), the first pipe 2a and the second pipe 2b may be arranged so that they are concentric. In other words, their longitudinal axes (and thus the pipes themselves) may be concentric. In the joint, the first pipe 2a and the second pipe 2b are connected together at their ends by a sliding ring 4 with an L profile. The joint 1 therefore also comprises a sliding ring 4.

The sliding ring 4 may be integrally formed. It will be seen that the L profile of the sliding ring 4 comprises a first portion which extends substantially parallel to longitudinal axes of the first and second pipes. In use, the first portion may be vertical, so can be referred to as a vertical portion. As shown, the first portion extends around the second pipe 2b. The L profile of the sliding ring 4 also comprises a second portion which is extends substantially perpendicular to the longitudinal axes of the first and second pipes. In use, the second portion may be horizontal, so can be referred to as a horizontal portion.

The first pipe 2a, which is the larger diameter pipe as shown, comprises a fitting seat 11 fixed at its end. As shown in FIG. 4, the fitting seat 11 may extend in a direction substantially perpendicular to the longitudinal axes of the first and second pipes. A flanged ring 13 is also provided. The flanged ring 13 may be provided adjacent the fitting seat 11. The flanged ring 13 may extend in a direction substantially perpendicular to the longitudinal axes of the first and second pipes. The flanged ring 13 and the fitting seat 11 may be configured to surround the horizontal portion of the sliding ring 4 at least partially. A compression element 12 may be provided. The compression element 12 may be configured for exerting a force to compress the fitting seat 11 against the flanged ring 13. The compression element 12 may be located between the flanged ring 13 and the fitting seat 11.

A first space 3b may be formed between the second portion of the sliding ring 4 and the fitting seat 11. This first space may be known as a horizontal space or a radially extending space, because the space is elongate in the radial direction. The present disclosure also envisages the use of a first plurality of gaskets in the space between the second portion of the sliding ring 4 and the fitting seat 11. The first plurality of gaskets are distributed in a row with a direction parallel to the second portion of the sliding ring. These gaskets may be known as special horizontal gaskets 5b. The first plurality of gaskets may be resistant to high temperatures and positioned in the space between the horizontal (i.e., second) portion of the sliding ring 4 and the fitting seat 11. The first plurality of (horizontal) gaskets 5b have the function of sealing the first (i.e., radially extending or horizontal) space 3b between the sliding ring 4 and the fitting seat 11. The first plurality of gaskets may also compensate for differential movement of the concentric pipes 2a,2b in the radial direction (i.e. the horizontal plane in use shown in FIG. 4), caused by thermal expansion.

The sliding ring 4 comprises a second space 3a (which may be considered to be a vertical annular space) in the recess area with the first (i.e. smaller diameter) pipe 2b. In other words, an annular space 3a may be formed between the first portion of the sliding ring and the first pipe 2b. This may be known as a vertical annular space, because it extends vertically in use, and in the orientation shown in FIG. 4. This feature may allow differential movement of the concentric pipes 2a,2b caused by the thermal expansion effect.

In addition, a second plurality of gaskets may be provided in the vertical annular space (i.e. in the second space 3a). The second plurality of gaskets may be distributed in a row with a direction parallel to the first portion of the sliding ring (i.e. parallel to the pipes, which may be vertical when in use). The second plurality of gaskets 5a may be known as (special) vertical gaskets 5a. The second plurality of gaskets may be resistant to high temperatures. They may be positioned in the vertical annular space 3a, and thus be positioned between the smaller-diameter pipe 2a and the sliding ring 4. The vertical gaskets 5a may compensate vertical differential movement of the concentric pipes 2a,2b caused by thermal expansion.

In some arrangements, the compression element 12 comprises at least one screw, or a plurality of screws 12, or some other type of fastener for urging the fitting seat 11 towards the flanged ring 13. This may compress the horizontal gasket 5b between the sliding ring 4 and the supporting seat 1 via the flanged ring 13.

In some arrangements, telescopic joint 1 comprises a stop 14 positioned between the sliding ring 4 and the fitting (or supporting) seat 11. The stop 14 may be configured to prevent crushing of the horizontal gaskets 5b and/or seizing of the joint in the radial direction. This may occur due to excessive pressure (or urging force) applied by the compression element 12. In the configuration illustrated, the stop comprises two projections 14, with one projection being fixed on the fitting seat 11 and the other projection being fixed on the flanged ring 13. This may limit mutual approach of these elements (i.e. limit the movement of the fitting seat relative to the flanged ring. It is emphasized, however, that other configurations may be adopted, so that this feature does not represent a limitation to the scope of protection of the present invention.

The telescopic joint 1 may be dimensioned as a function of the diameters of the concentric pipes 2a,2b. The dimensions and aspect ratio (i.e. the relation between the width, height and thickness) of the sliding ring 4 may also be dimensioned as a function of the diameters of the pipes 2a, 2b. Thus, the dimensions of the elements of the present disclosure do not represent a factor limiting its scope.

According to the present disclosure, the vertical gaskets 5a and horizontal gaskets 5b, which seal the spaces 3a,3b generated in the interconnection between the two concentric pipes 2a,2b and the sliding ring 4 and its supporting seat 11, may be rings of metal braid with insertion of resilient material. In other words, the metal braid may be wrapped around the resilient material. The resilient material may be resistant to a temperature of up to 600° C. Different materials and/or configurations of gaskets may be used, according to the design parameters of the joint. The gaskets may be dimensioned as a function of the diameter of the concentric pipes 2a,2b. They may also be dimensioned as a function of the annular space 3a and/or of the pressure of the screws 12 to allow compression of the horizontal gasket 5b. As will be apparent to a person skilled in the art, the dimensions of the vertical gaskets 5a and horizontal gaskets 5b may be dimensioned according to each application, so that this does not represent a factor limiting the scope of the present disclosure.

In the configuration described, the vertical gaskets 5a may be arranged sequentially with a sufficient number of turns (or a sufficient number of individual gaskets) for filling the full length of the annular space 3a. The number of turns may be a minimum of six turns. The horizontal gaskets 5b are arranged sequentially with a sufficient number of turns (or a sufficient number of individual gaskets) for filling the horizontal space 3b between the sealing seat 11 and the sliding ring 4 The number of turns may be a minimum of two turns.

Thus, the gaskets 5a,5b minimize the passage of gases and vapours through the spaces 3a,3b. This may allow the gases and vapours in the separating vessel 6 to be directed to the entrance of the collecting pipes 7.

In addition, in a manner that is not known in the art, the gaskets 5a,5b allow differential movement of the concentric pipes 2a,2b, in the radial and longitudinal direction. This may reduce or minimize the risks of seizing of a telescopic joint 1 since the spaces 3a,3b between the larger-diameter concentric pipe 2b and the tube of the sliding ring 4 may be greater than those identified in the prior art.

An additional advantage of the telescopic joint 1 now described is that it can undergo intervention in maintenance stops for replacing the gaskets 5b simply by removing the compression element(s) 12 and the flanged ring 13, for quickly returning to the original operating situation.

Optionally, the sliding ring 4 is constructed of material equivalent to (i.e. the same as, or similar to) that specified for the concentric pipes 2a,2b. However, it is emphasized that the material of construction does not represent a factor limiting the scope of the telescopic joint 1 of the present disclosure.

Thus, it is clear that the configuration of telescopic joint 1 described in the present specification, in which an L-shaped sliding ring 4 is adopted, as well as sealing by vertical gaskets 5a and horizontal gaskets 5b, maintains direct correlation with the process for which it is applied, as a function of the shearing generated by the movement of the interconnected parts, avoiding unwanted stops for maintenance and removal of coke when applied in an FCCU.

Therefore the telescopic joint 1 of the present disclosure makes it possible to use collecting pipes 7 in a strut-less cyclone 8 (as shown in FIG. 3) and consequently reduces formation of coke in the dead region of a separating vessel 6, ensuring operational reliability of a closed cyclone system and avoiding the use of joints with very small gaps that present risks resulting from mechanical problems during operation of an FCCU.

Numerous variations falling within the scope of protection of the present application are permitted. This reinforces the fact that the present invention is not limited to the particular configurations/embodiments described above.

Modifications of the above-described apparatuses and methods, combinations between different variations as practicable, and variations of aspects of the invention that are obvious to those of skill in the art are intended to be within the spirit and scope of the claims.

The invention claimed is:

1. A telescopic joint for connecting two pipes in a separating vessel of a fluid catalytic cracking unit, the joint comprising:
   a first pipe;
   a second pipe; and
   a stop positioned between a flanged ring and a fitting seat,
   wherein the first and second pipes are connected together at an end of each of the pipes by an L-shaped sliding ring comprising a vertical portion, and a horizontal portion,
   wherein the horizontal portion of the L-shaped sliding ring includes a notch formed in an upper surface of the horizontal portion,
   wherein the first pipe comprises the fitting seat fixed at the end of the first pipe, and the flanged ring,
   wherein the flanged ring and the fitting seat surround at least partially the horizontal portion of the sliding ring,
   wherein the telescopic joint further comprises a plurality of horizontal gaskets positioned horizontally in the notch formed in the upper surface of the horizontal portion of the L-shaped sliding ring,
   wherein the plurality of horizontal gaskets positioned horizontally in the notch formed in the upper surface of the horizontal portion of the L-shaped sliding ring are positioned within the fitting seat,
   wherein the horizontal gaskets are distributed in the notch in a direction parallel to the horizontal portion of the L-shaped sliding ring,
   wherein the stop is configured to prevent crushing of the plurality of horizontal gaskets or seizing of the telescopic joint in a radial direction, and
   wherein the stop comprises a first projection located on the fitting seat and a second projection located on the flanged ring.

2. The telescopic joint according to claim 1, wherein the vertical portion of the sliding ring extends around the second pipe.

3. The telescopic joint according to claim 1,
   wherein the vertical portion of the sliding ring comprises a vertical annular space, and
   wherein a plurality of vertical gaskets is provided in the vertical annular space such that the plurality of vertical gaskets is distributed in a direction parallel to the vertical portion of the sliding ring.

4. The telescopic joint according to claim 1, further comprising:
   a compression element for exerting a force for urging the fitting seat towards the flanged ring.

5. The telescopic joint according to claim 4, wherein the compression element comprises one or more screws.

6. The telescopic joint according to claim 2, wherein the plurality of vertical gaskets comprises rings of metal braid wrapped around a material resistant to a temperature of up to 600° C.

7. The telescopic joint according to claim 1, wherein the plurality of horizontal gaskets comprises rings of metal braid wrapped around a material resistant to a temperature of up to 600° C.

8. The telescopic joint according to claim 3, wherein the plurality of vertical gaskets are arranged sequentially with a sufficient number of turns for filling an entire length of the vertical annular space.

9. The telescopic joint according to claim 8, wherein the number of turns is six or more.

10. The telescopic joint according to claim 3, wherein the plurality of horizontal gaskets is arranged sequentially with a sufficient number of turns for filling the notch in the upper surface of the horizontal portion of the sliding ring between the fitting seat and the sliding ring.

11. The telescopic joint according to claim 10, wherein the number of turns is two or more.

12. The telescopic joint according to claim 1, wherein the sliding ring is at least partially constructed of a same material as the pipes.

13. The telescopic joint according to claim 1, wherein the first pipe and the second pipe are concentric.

14. The telescopic joint according to claim 1, wherein the L profile of the sliding ring is formed by the vertical portion of the sliding ring, which is substantially vertical when in use and the horizontal portion of the sliding ring, which is substantially horizontal when in use.

15. The telescopic joint according to claim 1, wherein the first and second pipes are in a cyclone.

16. The telescopic joint according to claim 1, wherein the first pipe has a larger diameter than the second pipe.

17. The telescopic joint according to claim 1,
   wherein a first portion of the vertical portion of the L-shaped sliding ring contacts a plurality of vertical gaskets provided in a vertical annular space.

* * * * *